(12) United States Patent
Lin et al.

(10) Patent No.: US 12,533,024 B2
(45) Date of Patent: Jan. 27, 2026

(54) EYESHADE STRUCTURE FOR BILIRUBIN DETECTION

(71) Applicant: GIGA-IMAGE Technology Co., Ltd., Taipei (TW)

(72) Inventors: Chih-Ju Lin, New Taipei (TW); Yi-Wei Liu, New Taipei (TW); Lee-Lin Tsai, New Taipei (TW)

(73) Assignee: GIGA-IMAGE Technology Co., Ltd., Taipei (TW)

( * ) Notice: Subject to any disclaimer, the term of this patent is extended or adjusted under 35 U.S.C. 154(b) by 346 days.

(21) Appl. No.: 18/369,562

(22) Filed: Sep. 18, 2023

(65) Prior Publication Data
US 2024/0315877 A1    Sep. 26, 2024

(30) Foreign Application Priority Data

Mar. 24, 2023    (CN) .......................... 202320605404.8

(51) Int. Cl.
| | | |
|---|---|---|
| *A61B 3/14* | (2006.01) | |
| *A61B 3/00* | (2006.01) | |
| *A61B 3/12* | (2006.01) | |
| *A61B 3/18* | (2006.01) | |
| *A61B 5/00* | (2006.01) | |
| *A61B 5/145* | (2006.01) | |

(Continued)

(52) U.S. Cl.
CPC .............. *A61B 3/14* (2013.01); *A61B 3/0008* (2013.01); *A61B 3/1233* (2013.01); *A61B 3/1241* (2013.01); *A61B 3/145* (2013.01); *A61B 3/18* (2013.01); *A61B 5/0059* (2013.01); *A61B 5/14546* (2013.01); *A61F 9/045* (2013.01); *G01J 3/10* (2013.01)

(58) Field of Classification Search
CPC ....... A61B 3/14; A61B 3/0008; A61B 3/1233; A61B 3/1241; A61B 3/145; A61B 3/18; A61B 5/0059; A61B 5/14546; A61B 5/00; A61B 5/0077; A61F 9/045; G01J 3/10
See application file for complete search history.

(56) References Cited

U.S. PATENT DOCUMENTS

2018/0333092 A1*  11/2018  Roshan ................ A61B 3/0091

FOREIGN PATENT DOCUMENTS

FI             124965 B  *  4/2015   ............... A61B 3/14

* cited by examiner

*Primary Examiner* — Eric F Winakur
*Assistant Examiner* — Sienna C Pyle
(74) *Attorney, Agent, or Firm* — Birch, Stewart, Kolasch & Birch, LLP

(57) ABSTRACT

An eyeshade structure for bilirubin detection includes a body, a first detection module, and a second detection module. The body includes a bottom plate and a side wall. The side wall is connected to the bottom plate and forms an accommodating space with the bottom plate. The first detection module is arranged on the bottom plate. The second detection module is arranged on the bottom plate and is adjacent to the first detection module. The first detection module and the second detection module each include a circuit board, a light-emitting element, an inner photographing element, and an outer photographing element. The circuit board is connected to the bottom plate. The light-emitting element is electrically connected to the circuit board. The inner photographing element is electrically connected to the circuit board. The outer photographing element is electrically connected to the circuit board.

14 Claims, 7 Drawing Sheets

(51) Int. Cl.
*A61F 9/04* (2006.01)
*G01J 3/10* (2006.01)

EYESHADE STRUCTURE FOR BILIRUBIN DETECTION

CROSS-REFERENCE TO RELATED APPLICATION

This non-provisional application claims priority under 35 U.S.C. § 119(a) to patent application Ser. No. 20/2320605404.8 filed in China on Mar. 24, 2023, the entire contents of which are hereby incorporated by reference.

BACKGROUND

Technical Field

The present invention relates an eyeshade structure, and in particular, to an eyeshade structure for bilirubin detection.

Related Art

Clinically, blood test can be used for measuring the concentration of bilirubin. Red blood cells are cells carrying oxygen in the human body, and the lifespan of the red blood cells is approximately 90-120 days. Approximately $1/120$-$1/90$ of the red blood cells in the body undergo apoptosis and generation every day. The apoptotic hemoglobin is transported to the liver through the blood to convert into bilirubin, which is metabolized by liver cells into fecal bilirubin and excreted into the intestine. When the liver function is abnormal and bilirubin cannot be metabolized and excreted into the intestine, it will be reversed back into the blood, so that an increase in the concentration of bilirubin in the blood occurs. Therefore, the concentration of bilirubin in the blood is also considered as one of the indicators of the liver function. Jaundice occurs due to excessively high levels of bilirubin, which can cause yellowing of the skin, scleras, and mucous membranes. Currently, there are tests for neonatal skin jaundice index on the market. Due to the thin skin of newborns and no interference from the deposition of carotene in the skin since they have not yet ingested carotene, jaundice index measurement through the skin of newborns is relatively accurate. However, due to factors such as sun exposure and diet, bilirubin measurement through the skin of adults can be inaccurate.

Because bilirubin is easy to be accumulated on the sclera, patients with jaundice are prone to scleral yellowing. In addition, traditional methods can detect the sclera visually, but the visual inspection results are often overly subjective and cannot be quantified. Moreover, when the concentration of bilirubin is 2 mg/dL or below, the human eyes cannot easily recognize it, so it is necessary to detect low concentrations of bilirubin through optical instruments. In addition, if optical instruments are used for detection, as most of the color composition of the sclera is analyzed through natural light environment photography, it is susceptible to interference from environmental light components. Therefore, when analyzing signals of red, green, and blue colors, it is easy to interfere with each other, leading to inaccurate analysis results.

SUMMARY

In view of this, according to some embodiments, an eyeshade structure for bilirubin detection is proposed, including a body, a first detection module, and a second detection module. The body includes a bottom plate and a side wall. The side wall is connected to the bottom plate and forms an accommodating space with the bottom plate. The first detection module is arranged on the bottom plate and located in the accommodating space. The second detection module is arranged on the bottom plate and located in the accommodating space; and is adjacent to the first detection module. The first detection module and the second detection module each include a circuit board, a light-emitting element, an inner photographing element, and an outer photographing element. The circuit board is connected to the bottom plate. The light-emitting element is electrically connected to the circuit board to emit light. The inner photographing element is electrically connected to the circuit board and located one side of the circuit board. The outer photographing element is electrically connected to the circuit board, and the outer photographing element corresponds to the inner photographing element and is located on the other side of the circuit board.

According to some embodiments, the side wall further includes a concave portion, and the concave portion is concave in a direction of the accommodating space.

According to some embodiments, the side wall further includes an extinction surface, and the extinction surface is a matte surface, a sandblasted surface, or an extinction paint surface.

According to some embodiments, the circuit board is an annular circuit board, a circular circuit board, or a rectangular circuit board.

According to some embodiments, a plurality of light-emitting elements are available, and all of the light-emitting elements are arranged on the circuit board in a spaced and annular manner.

According to some embodiments, a wavelength of the light emitted by the light-emitting element ranges from 355 nm to 500 nm.

According to some embodiments, the inner photographing element has a photographing direction, and an included angle is formed between the photographing direction and the circuit board. According to some embodiments, the included angle ranges from 15 degrees to 30 degrees.

According to some embodiments, the outer photographing element has a photographing direction, and an included angle is formed between the photographing direction and the circuit board. According to some embodiments, the included angle ranges from 5 degrees to 15 degrees.

According to some embodiments, a minimum height of the side wall is 8 mm.

According to some embodiments, a minimum spacing between the inner photographing element and the outer photographing element is 24.2 mm.

According to some embodiments, the eyeshade structure for bilirubin detection further includes a power supply unit, and the power supply unit is electrically connected to the first detection module and the second detection module and located in the accommodating space.

According to some embodiments, the eyeshade structure for bilirubin detection further includes a transmission unit, and the transmission unit is electrically connected to the first detection module and the second detection module and located in the accommodating space.

The detailed features and advantages of the present invention are described in detail in the implementation below, which are sufficient to enable any skilled in the art to understand the technical content of the present invention and implement it accordingly. According to the content disclosed in this specification, the claims, and the drawings, and any skilled in the art can easily understand the purpose and advantages of the present invention.

DETAILED DESCRIPTION

Figure 1:
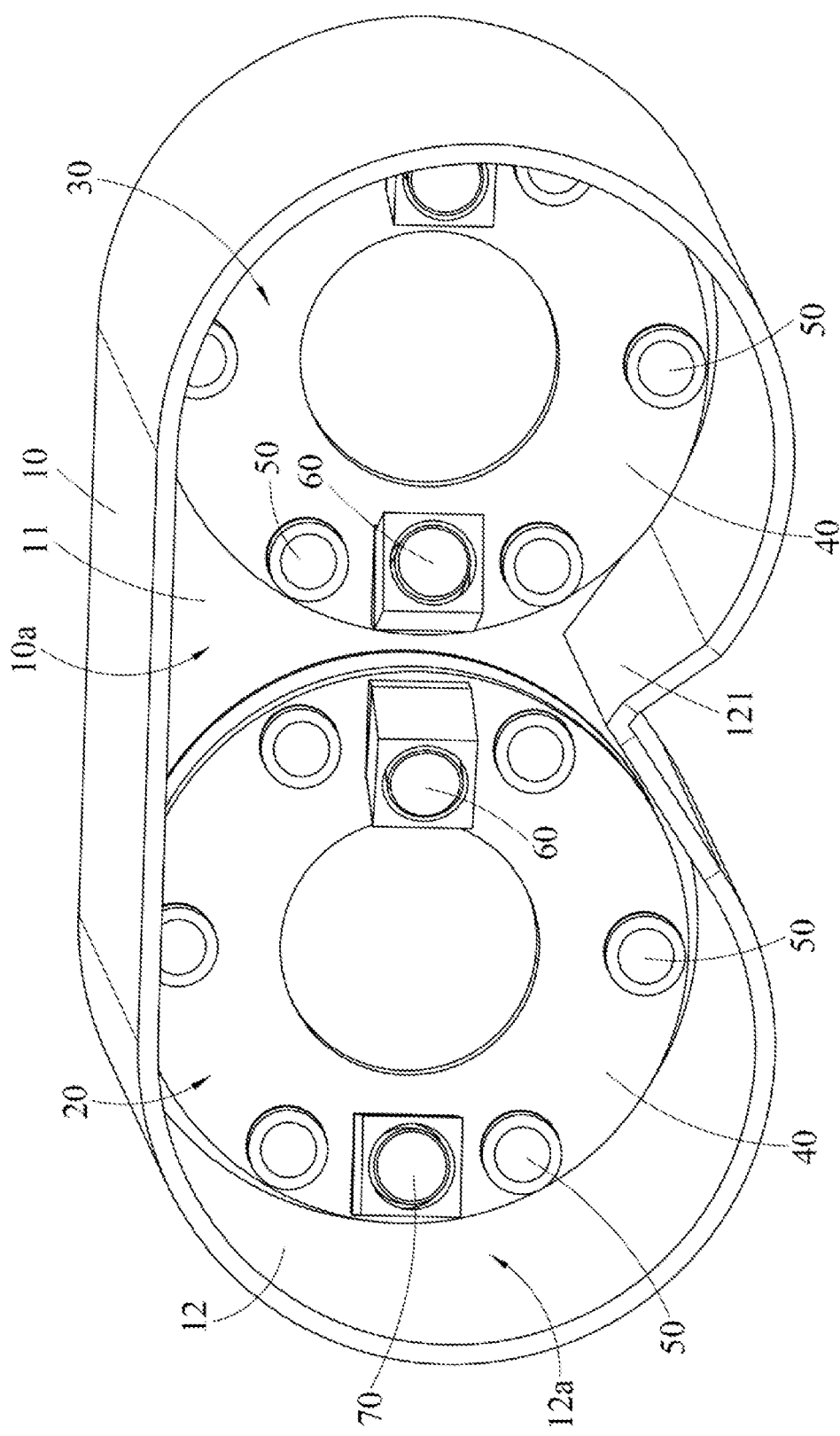
FIG. 1 is a schematic diagram of an eyeshade structure for bilirubin detection according to some embodiments.
Figure 2:
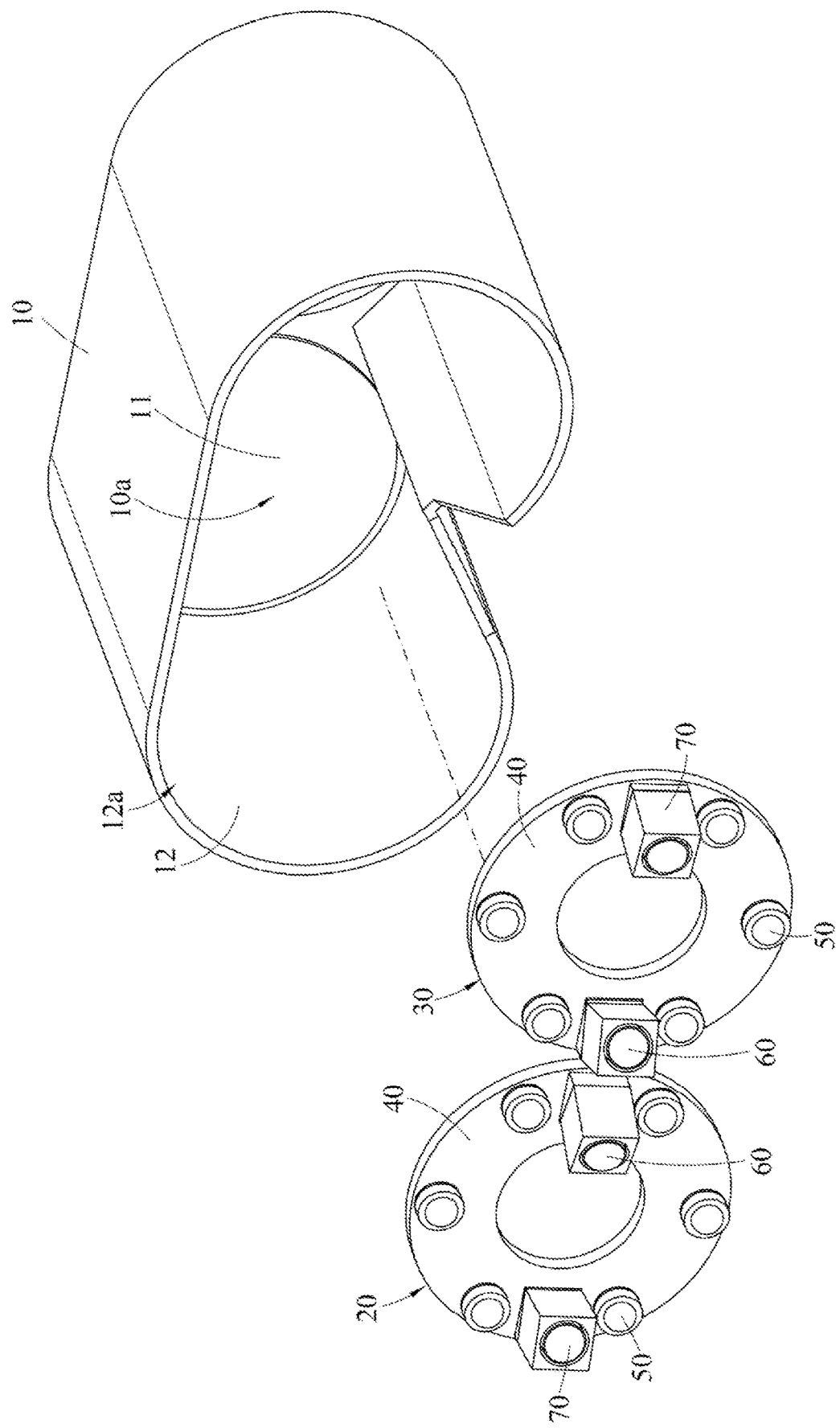
FIG. 2 is an exploded view of an eyeshade structure for bilirubin detection according to some embodiments.
Figure 3:
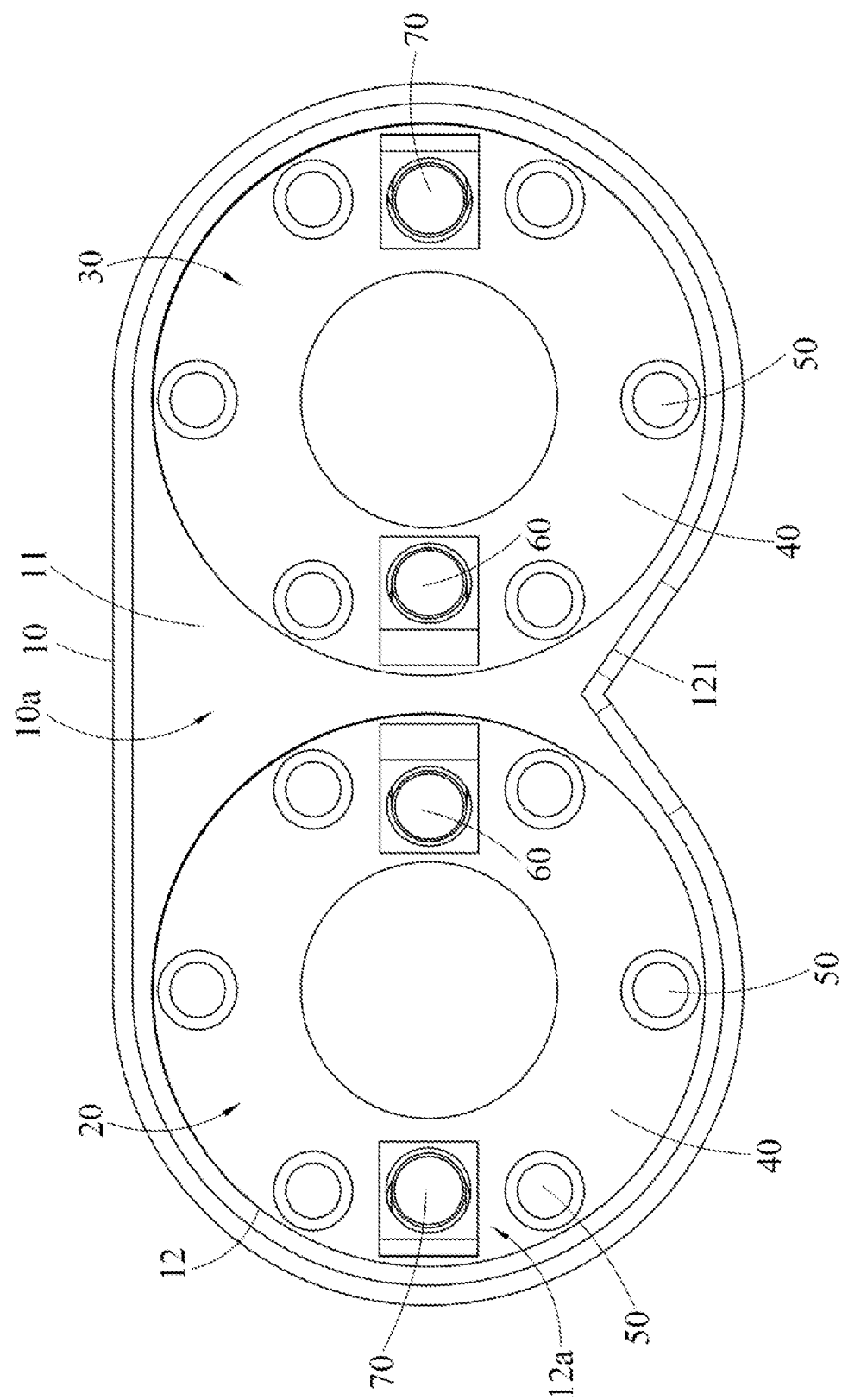
FIG. 3 is a schematic diagram of an eyeshade structure for bilirubin detection according to some embodiments from another perspective.

Referring to FIG. 1, FIG. 2 and FIG. 3, FIG. 1 is a schematic diagram of an eyeshade structure for bilirubin detection according to some embodiments. FIG. 2 is an exploded view of an eyeshade structure for bilirubin detection according to some embodiments. FIG. 3 is a schematic diagram of an eyeshade structure for bilirubin detection according to some embodiments from another perspective. The eyeshade structure for bilirubin detection of the present invention includes a body 10, a first detection module 20, and a second detection module 30.

The body 10 includes a bottom plate 11 and a side wall 12. The side wall 12 is connected to the bottom plate 11 and forms an accommodating space 10a with the bottom plate 11. In an embodiment, the corresponding two sides of the bottom plate 11 are roughly arc-shaped. Based on this, the side wall 12 extends along the side edge of the bottom plate 11 and perpendicular to the bottom plate 11 to form the accommodating space 10a with the bottom plate 11. In an embodiment, the minimum height formed by the extension of the side wall 12 is 8 mm. In some other embodiments, the height of the side wall 12 may be 8.5 mm, 9 mm, 9.5 mm, or 10 mm. In addition, the side wall 12 further includes an extinction surface 12a, and the extinction surface 12a is, for example, but not limited to a matte surface, a sandblasted surface, or an extinction paint surface. Based on this, the extinction surface 12a will be able to avoid light reflection in the accommodating space 10a (detailed description later).

The first detection module 20 is arranged on the bottom plate 11 and located in the accommodating space 10a. Likewise, the second detection module 30 is arranged on the bottom plate 11 and located in the accommodating space 10a; and is adjacent to the first detection module 20. In some embodiments, the side wall 12 further includes a concave portion 121, and the concave portion 121 is concave in the direction of the accommodating space 10a. In an embodiment, the overall shape and structure of the first detection module 20 and the second detection module 30 are roughly circular. Therefore, when the first detection module 20 is adjacent to the second detection module 30, a roughly V-shaped valley area will be formed between the first detection module 20 and the second detection module 30. Based on this, when the concave portion 121 is concave in the direction of the accommodating space 10a, the concave portion is accommodated in the roughly V-shaped valley area. Further, the side wall 12 further includes the concave portion 121, and therefore, when the eyeshade structure for bilirubin detection is worn on a user's face, the concave portion 121 of the eyeshade structure for bilirubin detection may precisely rest against the bridge of the user's nose to enable the user to wear more comfortably.

Here, the first detection module 20 and the second detection module 30 are of corresponding same structures. In some embodiments, when the first detection module 20 is adjacent to the second detection module 30, the first detection module 20 is mirrored to the second detection module 30. Based on this, the first detection module 20 and the second detection module 30 each include a circuit board 40, a light-emitting element 50, an inner photographing element 60, and an outer photographing element 70.

Taking the first detection module 20 as an example below, the structure of the first detection module 20 is the same as that of the second detection module 30. In some embodiments, the circuit board 40 is connected to the bottom plate 11 and located in the accommodating space 10a. The circuit board 40 is, for example, but not limited to an annular circuit board, a circular circuit board, or a rectangular circuit board. In an embodiment, the circuit board 40 is an annular circuit board (as shown in FIG. 1).

The light-emitting element 50 is electrically connected to the circuit board 40 to emit light. Here, the light-emitting element 50 is, for example, but not limited to an LED. Based on this, the light emitted by the light-emitting element 50 is emitted in the accommodating space 10a by the circuit board 40 in a direction away from the circuit board 40. In some embodiments, the side wall 12 further includes the extinction surface 12a. Based on this, the extinction surface 12a can prevent the light emitted by the light-emitting element 50 from being reflected in the accommodating space 10a. In some embodiments, the wavelength of the light emitted by the light-emitting elements 50 ranges from 355 nm to 500 nm, such as 360 nm, 380 nm, 390 nm, 400 nm, 410 nm, 420 nm, 430 nm, 440 nm, 450 nm, 460 nm, 470 nm, 480 nm, or 490 nm. In an embodiment, the wavelength of the light of the light-emitting elements 50 is 460 nm.

In some embodiments, a plurality of light-emitting elements 50 are available, and all of the light-emitting elements 50 are arranged on the circuit board 40 in a spaced and annular manner to form an annular array. Based on this, no matter whether the circuit board 40 is an annular circuit board, a circular circuit board, or a rectangular circuit board, the light-emitting elements 50 are arranged on the circuit board 40 in a spaced and annular manner to form an annular array. In an embodiment, 6 light-emitting elements 50 are available, and the 6 light-emitting elements are arranged on the circuit board 40 in a spaced and annular manner. Here, there are, for example, but not limited to 3, 4, 5, 6, 8, 9, or 10 light-emitting elements 50.

The inner photographing element 60 is electrically connected to the circuit board 40 and located one side of the circuit board 40. The outer photographing element 70 is electrically connected to the circuit board 40, and the outer photographing element 70 corresponds to the inner photographing element 60 and is located on the other side of the circuit board 40. Further, the inner photographing element 60 and the outer photographing element 70 are respectively located at the two endpoints of the circuit board 40 and correspond to each other. Here, the inner photographing element 60 and the outer photographing element 70 are, for example, but not limited to a scanning lens Here, when the first detection module 20 is adjacent to the second detection module 30, the inner photographing element 60 is the element located adjacent to the first detection module 20 and the second detection module 30. The outer photographing element 70 is the element that is far away from the first detection module 20 and the second detection module 30.

In some embodiments, when the circuit board 40 is an annular circuit board (as shown in FIG. 3) or a circular circuit board, the inner photographing element 60 and the outer photographing element 70 are respectively located at the periphery of the annular circuit board or the circular circuit board, and correspond to each other on the diameter of the annular circuit board or the circular circuit board. Based on this, the minimum spacing between the inner photographing element 60 and the outer photographing element 70 is 24.2 mm, such as 25 mm, 26 mm, 27 mm, 28 mm, 29 mm, or 30 mm. In some embodiments, the light-emitting element 50, the inner photographing element 60, and the outer photographing element 70 can be arranged together to form an annular array (as shown in FIG. 3). In an embodiment, the inner photographing element 60 and the outer photographing element 70 of the first detection module 20 and the second detection module 30 are arranged in a straight line. As shown in FIG. 3, two inner photographing elements 60 and two outer photographing elements 70 are arranged in a straight line.

Figure 4:
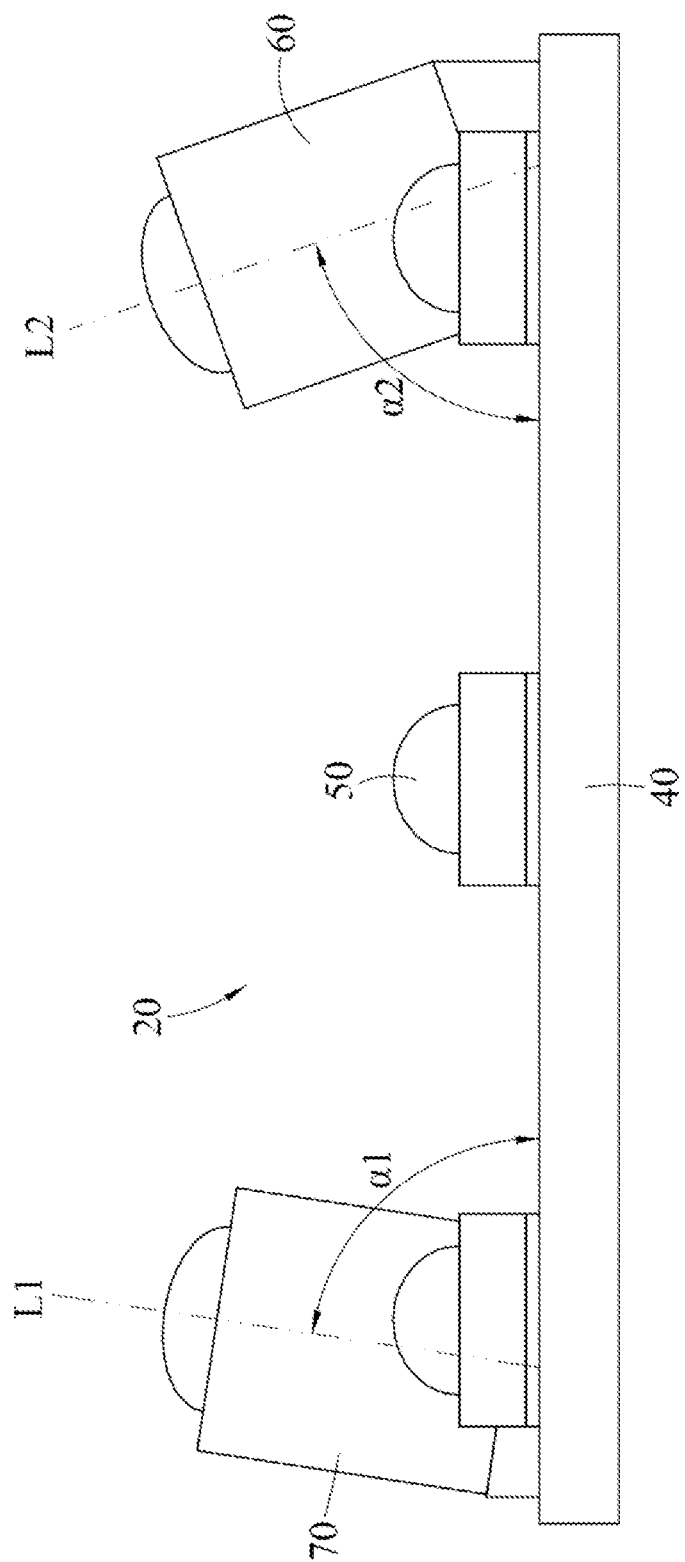
FIG. 4 is a side view of a first detection module according to some embodiments.

Referring to FIG. 4, FIG. 4 is a side view of a first detection module according to some embodiments. Here, taking the first detection module 20 as an example, the structure of the first detection module 20 is the same as that of the second detection module 30. The inner photographing element 60 has a photographing direction L2, and an included angel α2 is formed between the photographing direction L2 and the circuit board 40. In some embodiments, the included angel α2 of the inner photographing element 60 ranges from 15 degrees to 30 degrees, such as 20 degrees or 25 degrees. Moreover, the outer photographing element 70 has a photographing direction L1, and an included angel α1 is formed between the photographing direction L1 of the outer photographing element 70 and the circuit board 40. In some embodiments, the included angel α1 of the outer photographing element 70 ranges from 5 degrees to 15 degrees, such as 8 degrees, 10 degrees, or 12 degrees.

Further, the extension lines of the photographing direction L2 of the inner photographing element 60 and the photographing direction L1 of the outer photographing element 70 will intersect with each other. Taking FIG. 4 as an example, the extension line of the photographing direction L2 of the inner photographing element 60 and the extension line of the photographing direction L1 of the outer photographing element 70 will intersect with each other. This is, the angle direction of inclination of the inner photographing element 60 inclines towards the outer photographing element 70, while the angle direction of inclination of the outer photographing element 70 inclines towards the inner photographing element 60.

Figure 5:
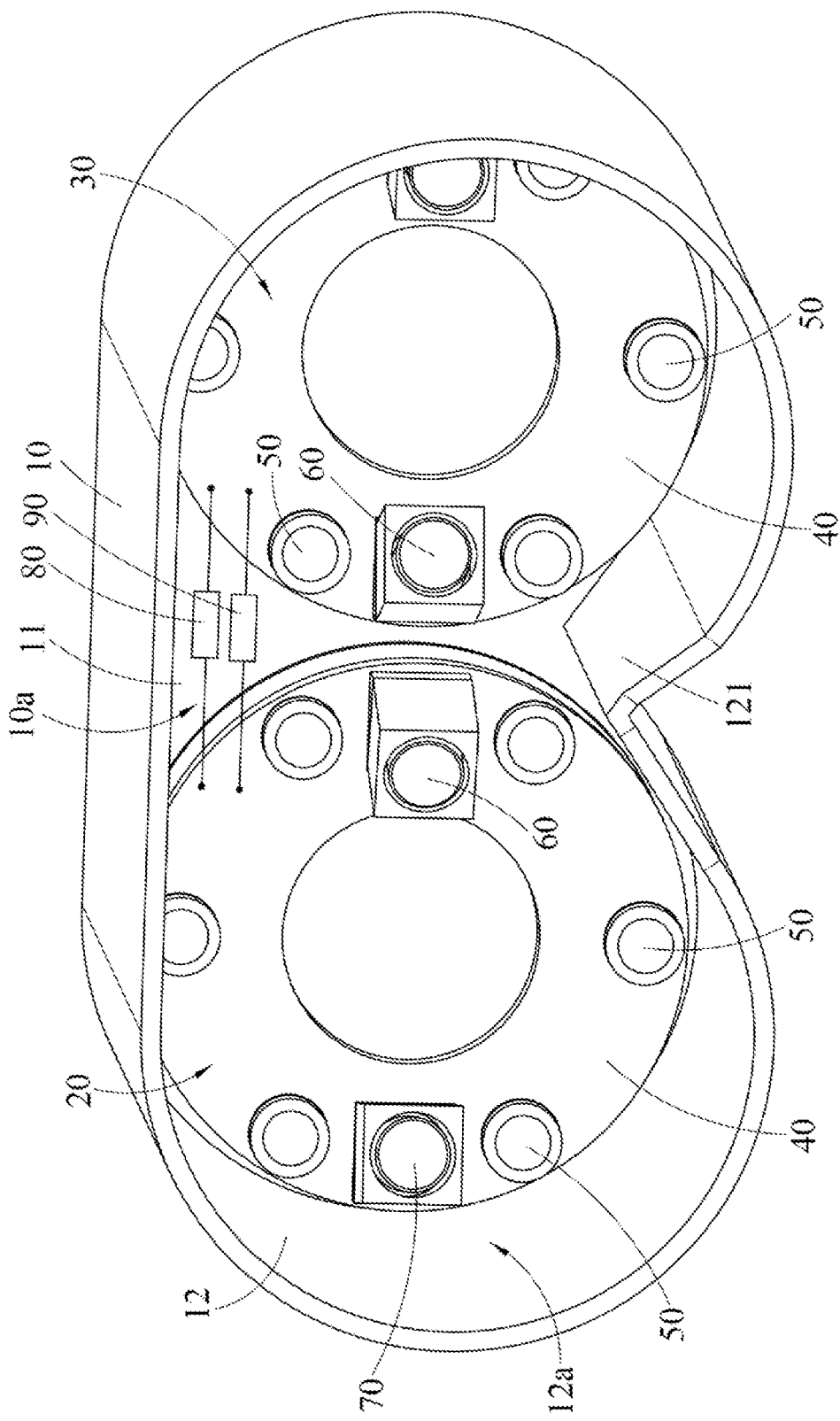
FIG. 5 is a schematic diagram of another embodiment of an eyeshade structure for bilirubin detection.

Referring to FIG. 5, FIG. 5 is a schematic diagram of another embodiment of an eyeshade structure for bilirubin detection. The eyeshade structure for bilirubin detection further includes a power supply unit 80, and the power supply unit is electrically connected to the first detection module 20 and the second detection module 30 and located in the accommodating space 10a. In some embodiments, the power supply unit 80 is a battery or charging adapter (such as a USB charging base) to provide power supply for the operation of the circuit board 40, and further drives the inner photographing element 60 and the outer photographing element 70 for photographing and drives the light-emitting element 50 to emit light. In addition, the eyeshade structure for bilirubin detection further includes a transmission unit 90, and the transmission unit is electrically connected to the first detection module 20 and the second detection module 30 and located in the accommodating space 10a. In some embodiments, the transmission unit 90 may be a wired or wireless network transmission chip to transmit images taken by the inner photographing element 60 and the outer photographing element 70.

Figure 6:
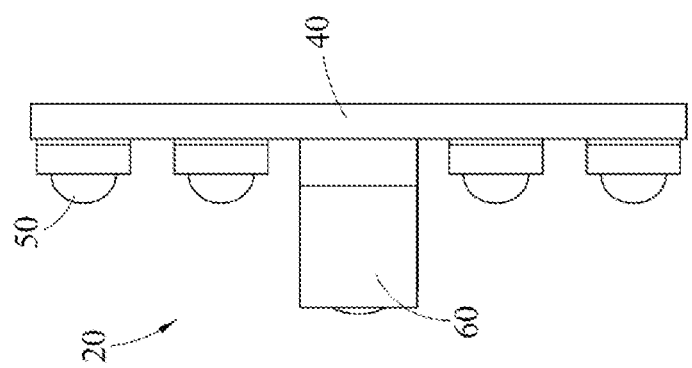
FIG. 6 is a schematic diagram of a first detection module from a perspective of the inner photographing element according to some embodiments.
Figure 6:
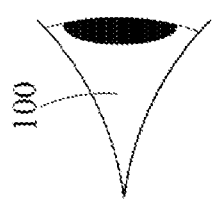

Referring to FIG. 6, FIG. 6 is a schematic diagram of a first detection module from a perspective of the inner photographing element according to some embodiments. In an embodiment, the eyeshade structure for bilirubin detection is worn on a user's face and located at the eyes. Based on this, the inner photographing element 60 and the outer photographing element 70 of the first detection module 20 and the second detection module 30, as well as the light-emitting element 50, all face the user's eyes. Taking FIG. 6 as an example, the first detection module 20 corresponds to the user's left eye 100. The second detection module 30 corresponds to the user's right eye (not shown in the figures).

When the eyeshade structure for bilirubin detection is activated, after all light-emitting elements 50 are lighted up simultaneously, then the inner photographing element 60 and the outer photographing element 70 will take photos simultaneously. In addition, in order to avoid the error caused by reducing single image measurement, the inner photographing element 60 and the outer photographing element 70 will take 10 consecutive images, and automatically turn off the light-emitting element 50 after taking photos. Based on this, the inner photographing element 60 and the outer photographing element 70 (a total of four cameras) will respectively take 10 photos and transmit them through the transmission unit 90 to an external computer for calculation. In some embodiments, the lighting up of the light-emitting element 50 and the photographing process are completed within 3 seconds to reduce the damage of blue light to the eyes. All the light-emitting elements 50 cannot directly illuminate the user's pupils to prevent the blue light from entering the eyes and causing retinal damage. Additionally, each of the light-emitting elements 50 has a power of 0.1 mW. After lighting up for 0.5 seconds, the inner photographing element 60 and the outer photographing element 70 immediately take photos, 10 images are taken within 2 seconds, respectively, and all the light-emitting elements 50 are turned off within 0.5 seconds after taking photos.

Figure 7:
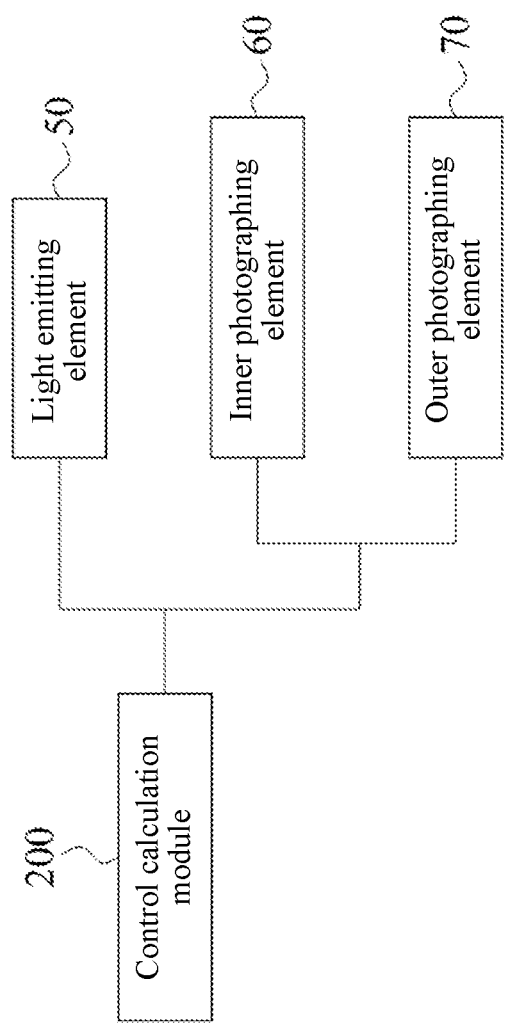
FIG. 7 is a block diagram of a control calculation module, an inner photographing element, an outer photographing element, and a light-emitting element according to some embodiments.

Referring to FIG. 7, FIG. 7 is a block diagram of a control calculation module, an inner photographing element, an outer photographing element, and a light-emitting element according to some embodiments. In some embodiments, the external computer includes a control calculation module 200 (such as a processor). When using the eyeshade structure for bilirubin detection, it is worn on the user's head, and the light-emitting element 50, the inner photographing element 60, and the outer photographing element 70 are located in front of the user's eyes to take blue light images of sclera on both sides of the eyes. After the user wears the eyeshade structure for bilirubin detection, it is determined that there is no external light leakage, and the user is in an open eye state while keeping their eyeballs stationary. The switch of the eyeshade structure for bilirubin detection is activated (in an embodiment, the control calculation module 200 controls the operation of the light-emitting element 50, the inner photographing element 60, and the outer photographing element 70). After all the light-emitting elements 50 are lighted up simultaneously, the inner photographing element 60 and the outer photographing element 70 of the first detection module 20 and the second detection module 30 take photos simultaneously. Meanwhile, in order to avoid the error caused by reducing single image measurement, 10 consecutive images will be taken, and all the light-emitting elements 50 are automatically turned off after taking photos. The inner photographing element 60 and the outer photographing element 70 (a total of four cameras) of the first detection module 20 and the second detection module 30 will respectively take 10 photos and transmit them to the external computer (the control calculation module 200) for calculation.

The skin and iris are tissues with low reflectivity for 460 nm, and therefore only the sclera has a higher reflectivity for 460 nm. Based on this, the reflection values of the skin, iris, and other tissues are set as thresholds, and the area exceeding the threshold is averaged for reflection intensity. That is, the bilirubin value can be automatically calculated and determined by the control calculation module 200 after a few seconds. Further, after deducting the areas outside the sclera (pixel points below the threshold) from the taken image, the average intensity of each remaining pixel point value is calculated through the control calculation module 200, which can calculate the value of bilirubin and further inform the user of the degree of jaundice.

To sum up, in some embodiments, the eyeshade structure for bilirubin detection of the embodiments of the present invention is provided with the photographing elements and the light-emitting elements inside the body, so that when the sclera is inspected through optical detection, it is not affected by environmental light components. Meanwhile, by using the eyeshade structure for bilirubin detection in the embodiments of the present invention, the problem of overly subjective and unquantifiable visual detection of the sclera in prior art is further solved. Besides, the present invention utilizes the optical properties of bilirubin, with a peak absorption spectrum located at a wavelength of approximately 460 nm and no other absorption peaks in other visible light bands. In addition, the penetration rate of the sclera in the blue light band is low. Therefore, the present invention uses the light of a wavelength of 460 nm to irradiate the sclera. After being absorbed by the sclera and bilirubin, the remaining light intensity will be reflected, and the eyeballs will be taken through the photographing elements for analysis of the reflection amount.

Certainly, the present invention can also have various other embodiments. Those skilled in the art can make various corresponding changes and deformations based on the present invention without departing from the spirit and essence of the present invention, but these corresponding changes and deformations shall fall within the protection scope of the claims of the present invention.

What is claimed is:

1. An eyeshade structure for bilirubin detection, comprising:
   a body, comprising:
   a bottom plate, and a side wall, connected to the bottom plate and forming an accommodating space with the bottom plate;
   a first detection module, arranged on the bottom plate and located in the accommodating space; and
   a second detection module, arranged on the bottom plate and located in the accommodating space; adjacent to the first detection module,
   wherein the first detection module and the second detection module each comprise:
   a circuit board, connected to the bottom plate;
   a light-emitting element, electrically connected to the circuit board to emit light;
   an inner photographing element, electrically connected to the circuit board and located on one side of the circuit board;
   and an outer photographing element, electrically connected to the circuit board, the outer photographing element corresponding to the inner photographing element and being located on the other side of the circuit board.

2. The eyeshade structure for bilirubin detection according to claim 1, wherein the side wall further comprises a concave portion, and the concave portion is concave in a direction of the accommodating space.

3. The eyeshade structure for bilirubin detection according to claim 1, wherein the side wall further comprises an extinction surface, and the extinction surface is a matte surface, a sandblasted surface, or an extinction paint surface.

4. The eyeshade structure for bilirubin detection according to claim 1, wherein the circuit board is an annular circuit board, a circular circuit board, or a rectangular circuit board.

5. The eyeshade structure for bilirubin detection according to claim 1, wherein a plurality of light-emitting elements are available, and all of the light-emitting elements are arranged on the circuit board in a spaced and annular manner.

6. The eyeshade structure for bilirubin detection according to claim 1, wherein a wavelength of the light emitted by the light-emitting element ranges from 355 nm to 500 nm.

7. The eyeshade structure for bilirubin detection according to claim 1, wherein the inner photographing element has a photographing direction, and an included angle is formed between the photographing direction and the circuit board.

8. The eyeshade structure for bilirubin detection according to claim 7, wherein the included angle ranges from 15 degrees to 30 degrees.

9. The eyeshade structure for bilirubin detection according to claim 1, wherein the outer photographing element has a photographing direction, and an included angle is formed between the photographing direction and the circuit board.

10. The eyeshade structure for bilirubin detection according to claim 9, wherein the included angle ranges from 5 degrees to 15 degrees.

11. The eyeshade structure for bilirubin detection according to claim 1, wherein a minimum height of the side wall is 8 mm.

12. The eyeshade structure for bilirubin detection according to claim 1, wherein a minimum spacing between the inner photographing element and the outer photographing element is 24.2 mm.

13. The eyeshade structure for bilirubin detection according to claim 1, further comprising a power supply unit, wherein the power supply unit is electrically connected to the first detection module and the second detection module and located in the accommodating space.

14. The eyeshade structure for bilirubin detection according to claim 1, further comprising a transmission unit, wherein the transmission unit is electrically connected to the first detection module and the second detection module and located in the accommodating space.

* * * * *